United States Patent [19]
Cho

[11] Patent Number: 6,005,769
[45] Date of Patent: Dec. 21, 1999

[54] COMPUTER AND COMPUTER SYSTEM HAVING A FUNCTION OF AUTO POWER OFF BEFORE CONNECTING WITH AN EXPANSION SYSTEM AND HAVING PUSH BUTTON CONTROL THEREOF

[75] Inventor: Duk-Soon Cho, Kyunggi-do, Rep. of Korea

[73] Assignee: SamSung Electronics Co., Ltd., Kyungki-do, Rep. of Korea

[21] Appl. No.: 08/987,857

[22] Filed: Dec. 9, 1997

[30] Foreign Application Priority Data

Dec. 9, 1996 [KR] Rep. of Korea ............ 96-63244

[51] Int. Cl.$^6$ ................................. H05K 5/00
[52] U.S. Cl. ................. 361/686; 710/103; 710/101; 713/324; 713/330
[58] Field of Search ................. 395/281–283, 395/750.07, 750.08, 734, 737, 741; 361/683–687

[56] References Cited

U.S. PATENT DOCUMENTS

| | | | |
|---|---|---|---|
| 5,283,714 | 2/1994 | Tsai et al. | 361/683 |
| 5,463,742 | 10/1995 | Kobayashi | 395/281 |
| 5,488,572 | 1/1996 | Belmont | 395/281 |
| 5,526,493 | 6/1996 | Shu | 395/281 |
| 5,555,491 | 9/1996 | Tao | 361/686 |
| 5,598,537 | 1/1997 | Swanstrom et al. | 395/281 |
| 5,598,539 | 1/1997 | Gephardt et al. | 395/281 |
| 5,642,517 | 6/1997 | Shirota | 395/750.01 |
| 5,694,292 | 12/1997 | Paulsel et al. | 361/686 |
| 5,768,101 | 6/1998 | Cheng | 361/687 |
| 5,768,541 | 6/1998 | Pan-Ratzlaff | 395/283 |
| 5,784,253 | 7/1998 | Ooka et al. | 361/686 |
| 5,805,412 | 8/1998 | Yanagisawa et al. | 361/686 |
| 5,822,547 | 10/1998 | Boesch et al. | 395/283 |
| 5,832,237 | 11/1998 | Lee | 395/281 |
| 5,838,541 | 11/1998 | Mesfin et al. | 361/686 |
| 5,841,632 | 11/1998 | Horii et al. | 361/686 |
| 5,862,036 | 1/1999 | Lin | 361/686 |
| 5,870,283 | 2/1999 | Maeda et al. | 361/686 |

*Primary Examiner*—Ayaz R. Sheikh
*Assistant Examiner*—Raymond N Phan
*Attorney, Agent, or Firm*—Robert E. Bushnell, Esq.

[57] ABSTRACT

A portable computer system having automatic power cutoff function is disclosed. The main power supply of the portable computer is interrupted before connecting with an expansion system. The automatic power off operation is performed by a lever 50 and a power switch 41 arranged in the portable computer. The lever 50 is pivotally mounted adjacent to an expansion port 20 and the switch 41 is located on the circuit board 18 of the portable computer such that button 42 of the switch 41 is positioned underneath one end of the lever 50. An opening 46 is formed at one side of the mounting screw 24 of the expansion port 20 in order to pass through the other end of the lever 50. When the portable computer is placed in position on the docking station 14, a bracket 28 drawn out of the docking station 14 is lifted for a predetermined height where the top portion thereof contacts with the mounting screw 24 and the protrusion of the lever 50. With this, the lever 50 moves upwardly and thus rotates counterclockwise to press the button of the switch 41. This allows the power switch 41 to be in electrical off (open) state, just before coupling of the expansion port 20 of the portable computer 10 to the port replicator 22 of the docking station 14. Thus, the present invention provides for a basic protection of the portable computer against overvoltage applied from the docking station, and thereby preventing unexpected data loss in a semiconductor memory and damage of the computer mainboard.

19 Claims, 7 Drawing Sheets

COMPUTER AND COMPUTER SYSTEM HAVING A FUNCTION OF AUTO POWER OFF BEFORE CONNECTING WITH AN EXPANSION SYSTEM AND HAVING PUSH BUTTON CONTROL THEREOF

CLAIM OF PRIORITY

This application makes reference to, incorporates the same herein, and claims all benefits accruing under 35 U.S.C. §119 from an application for A COMPUTER AND COMPUTER SYSTEM HAVING A FUNCTION OF AUTO POWER OFF BEFORE CONNECTING WITH AN EXPANSION SYSTEM earlier filed in the Korean Industrial Property Office on Dec. 9, 1996 and there duly assigned Serial No. 63244/1996.

1. Field of the Invention

The present invention relates to a computer system, and more particularly to a portable computer system having a function of an automatic power cutoff before connecting with an expansion system.

2. Background of the Invention

A portable computer such as a notebook computer can be differentiated from a desktop computer in terms of its movability, simplicity, and smaller size. The portable computer, however, has limitations in providing various functions due to its smaller size. In order to allow a portable computer to have additional functions which so that it may replace a desktop computer, there is provided a docking station that includes various expansion devices, for example CD-ROM drives, an extra sound card or video card, modems, and an additional battery or AC adapter. Usually, the docking station is made as an optional device for a specific portable computer, and is provided with a special port or connector called "port replicator." In addition, peripheral devices such as an external display monitor, mouse, keyboard or speakers may be optionally connected to the docking station. The port replicator is coupled to an expansion port specially provided in the portable computer, to connect electrically and mechanically the portable computer with the docking station. With this connection, a total link can be made between the computer mainboard and the expansion devices as well as peripheral devices of the docking station. Thus, enhancing the expandability of the portable computer is possible in an easy and convenient way.

In the above-mentioned expansion system, a problem arises when the portable computer is coupled to the docking station while the power supplies are on. If a computer user inadvertently connects the expansion port of the portable computer with the port replicator of the docking station without turning off the power to the portable computer, high power supply voltage from the docking station (a high DC voltage output of the AC adapter) is directly applied to an electronic circuit of the mainboard and overcurrent flows into semiconductor devices via the port replicator. This will result in unexpected data loss in a semiconductor memory as well as severe damage of the computer mainboard.

Thus, there is a need for protection off the portable computer against overvoltage applied from the docking station when the portable computer is attached to or detached from the docking station in power-on state.

U.S. Pat. No 5,526,493 for a Docking Detection And Suspend Circuit For Portable Computer/Expansion Chassis Docking System to Shu discloses a docking detection and suspend circuit for a portable computer/docking station combination. While the portable computer is being inserted into the docking station, a detection circuit detects the insertion and automatically suspends power to the portable computer. I have not seen a portable computer system/docking station combination where a push button is required to be actuated to attach a portable computer to the docking station. Further, I have not seen a portable computer/docking station combination where the depression of the button also cuts the power to the portable computer while electrically and mechanically attaching the portable computer to the docking station.

SUMMARY OF THE INVENTION

It is therefore an object of the invention to provide a portable computer system having automatic power off function which can cutoff main power supply of the portable computer while connecting with the docking station.

It is also an object to provide a portable computer/docking station combination that requires a user to depress a push button that simultaneously cuts off the power to the portable computer and electrically and mechanically attaches the portable computer to the docking station.

In accordance with the present invention, the above object is achieved by a portable computer system incorporating with an expansion system which comprises an expansion port being arranged at the rear frame of the portable computer for communicating with said expansion system; and a means for interrupting the main power supply of the portable computer being arranged to operate in conjunction with docking operation of the expansion system, wherein the main power supply line of the computer is cutoff just before coupling with the expansion port of the expansion system.

The portable computer system further comprises a mounting screw arranged at either side of the expansion port, and a bracket being mounted at the expansion system for catching the mounting screw when docking operation is started, wherein the bracket is lifted to the position where the top portion thereof contacts with the mounting screw and the power supply interrupting means is actuated.

According to another aspect of the invention, there is provided a computer system having a portable computer and an expansion system for incorporating with the portable computer, which comprises an expansion port arranged at rear frame of the portable computer for communicating with said expansion system; a connector being arranged at top portion of said expansion system for coupling with said expansion port; means for interrupting the main power supply of the portable computer being arranged to operate in conjunction with docking operation of the expansion system, wherein the main power supply line of the computer is cutoff just before coupling of the expansion port to the connector of the expansion system.

In the preferred embodiment of this invention, the main power supply interrupt means includes a lever pivotally mounted adjacent to one of the mounting screws with one end being passed through the rear frame and the other end being extended in an opposite direction at a predetermined length; an opening formed at a port bracket of the rear frame apart from one of said mounting screw for passing through one end of the lever, in which the longitudinal dimension of the opening is much larger than the sectional dimension of the lever; and a switch located on a circuit board of the portable computer such that a button of the switch is positioned underneath the other end of the lever and is actuated when the lever is lifted up by the bracket of the docking station.

According to the present invention, the automatic power off device performs power interrupt operation just before coupling of the expansion port of the portable computer to the port replicator of the docking station. Thus, the present invention provides for a basic protection of the portable computer against overvoltage applied from the docking station, and thereby preventing unexpected data loss in a semiconductor memory and damage of the computer mainboard.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Figure 1:
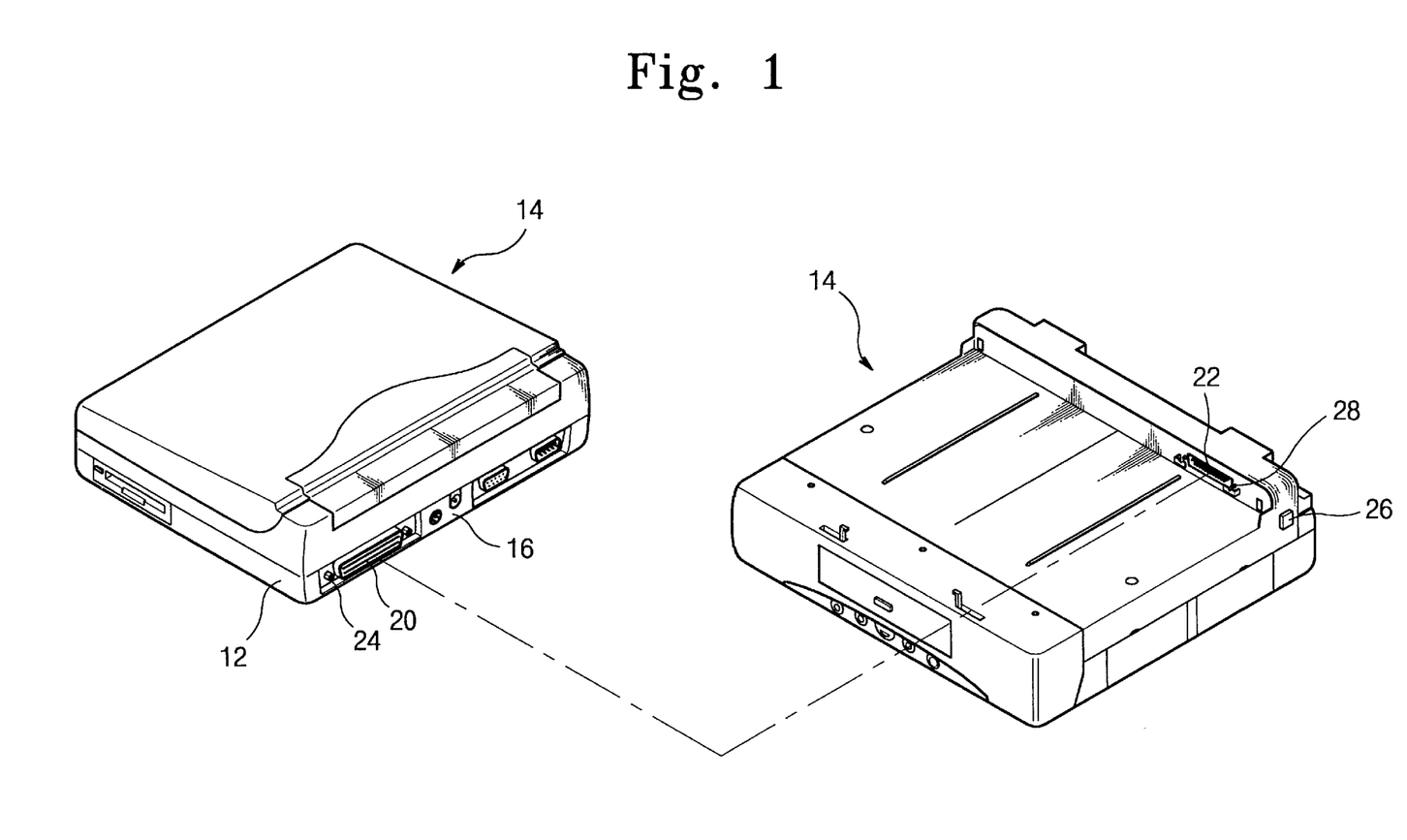
FIG. 1 is a perspective view showing a conventional portable computer and a docking station for incorporating with the portable computer.

In FIG. 1, a conventional portable computer 10 and docking station 14 are shown separated from each other. The portable computer 10 is attached to the docking station 14 by placing it upon the top surface of the docking station 14. At rear frame 16 of main body 12 of the portable computer 10, there is provided with an expansion port 20 for electrically connecting with the docking station 14. The expansion port 20 is mounted to the rear frame 16 by using a metallic port bracket (not shown).

Figure 2:
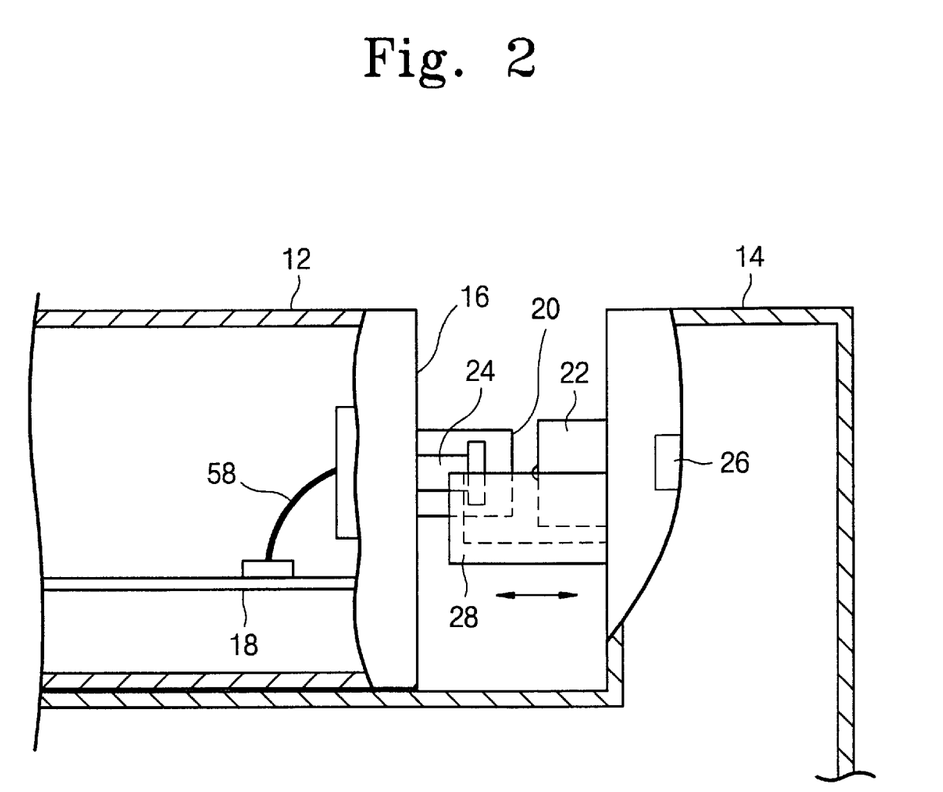
FIG. 2 is a side elevation partly in section for illustrating the docking operation of the conventional portable computer and docking station.

At rear side of the docking station 14, a connector or port replicator 22 is provided to couple to the expansion port 20. To connect mechanically the portable computer 10 with the docking station 14, a pair of mounting screws 24 is provided at either side of the expansion port 20 and a pair of brackets 28 at either side of the port replicator 22. Reference numeral 26 denotes a push button provided at side portion of the docking station 14. When the push button 26 is pressed, each brackets 28 are drawn outwardly for a predetermined length, by a driving mechanism, and when it is pressed again, the bracket 28 is lifted to contact with the mounting screw 24 and pull inwardly to couple the expansion port 20 of the portable computer to port replicator 22 of the docking station, as shown in FIG. 2. The driving mechanism that moves the bracket 28 has not been illustrated in order to simplify the drawings. In particular, the mounting screw 24 has a head portion caught by upper portion of the bracket 28. Reference numeral 18 denotes a circuit board mounted within the main body 12. The expansion port 20 is electrically connected with the circuit board 18 via a flat cable 58. With this connection, a total link can be made between the computer mainboard and expansion devices as well as peripheral devices of the docking station 14.

Figure 3:
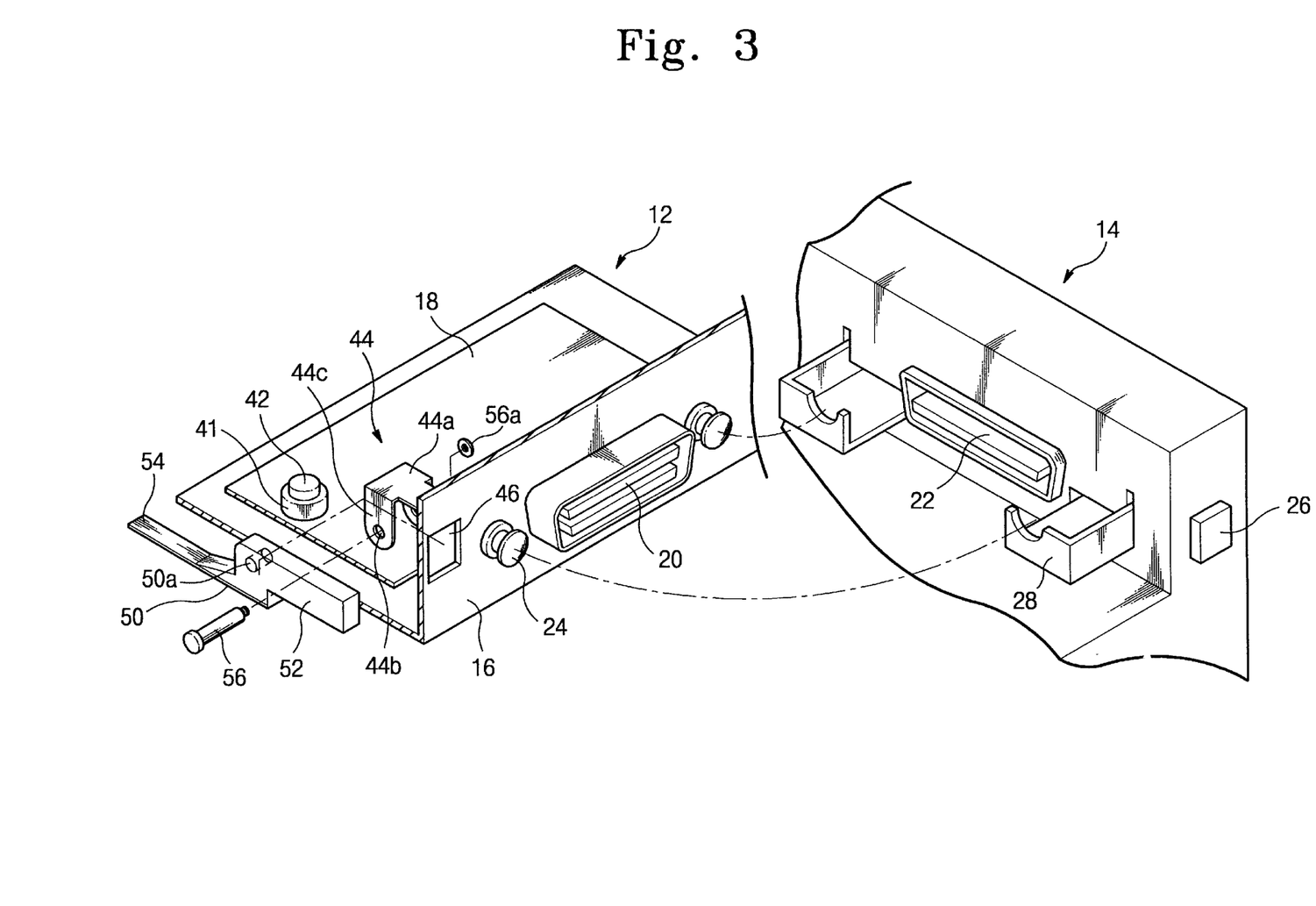
FIG. 3 is a partly exploded enlarged view for showing an automatic power off device installed in an expansion port of the portable computer in accordance with the present invention.

Referring to FIG. 3, there is shown an automatic power off device installed in the portable computer in accordance with the present invention. The automatic power off device includes a lever 50 and a power switch 41. The lever 50 is mounted adjacent to one of the mounting screws 24 of the expansion port 20. The lever 50 has center portion having a hole 50a and a protrusion 52 extending outwardly to the rear frame 16. Apart from one of the mounting screws 24, the port bracket of the rear frame 16 is formed with an opening 46. A thin elastic blade 54 is attached at the bottom of lever 50 extends in a direction opposite to protrusion 52.

Further, a support member 44 is provided at the port bracket of the expansion port 20 for pivotally mounting the lever 50. The support member 44 has a platform 44a and a bending portion 44c extending downwardly from either side of the platform 44a. At center portion of each bending portion 44c, there is formed a hole 44b. Pin 56 and E-ring 56a are provided at the support member 44 for pivotally mounting the lever 50 by inserting the pin 56 into the center portion of the lever 50 through the hole 44b and by securing the E-ring 56a at the distal end of the pin 56.

Figure 4:
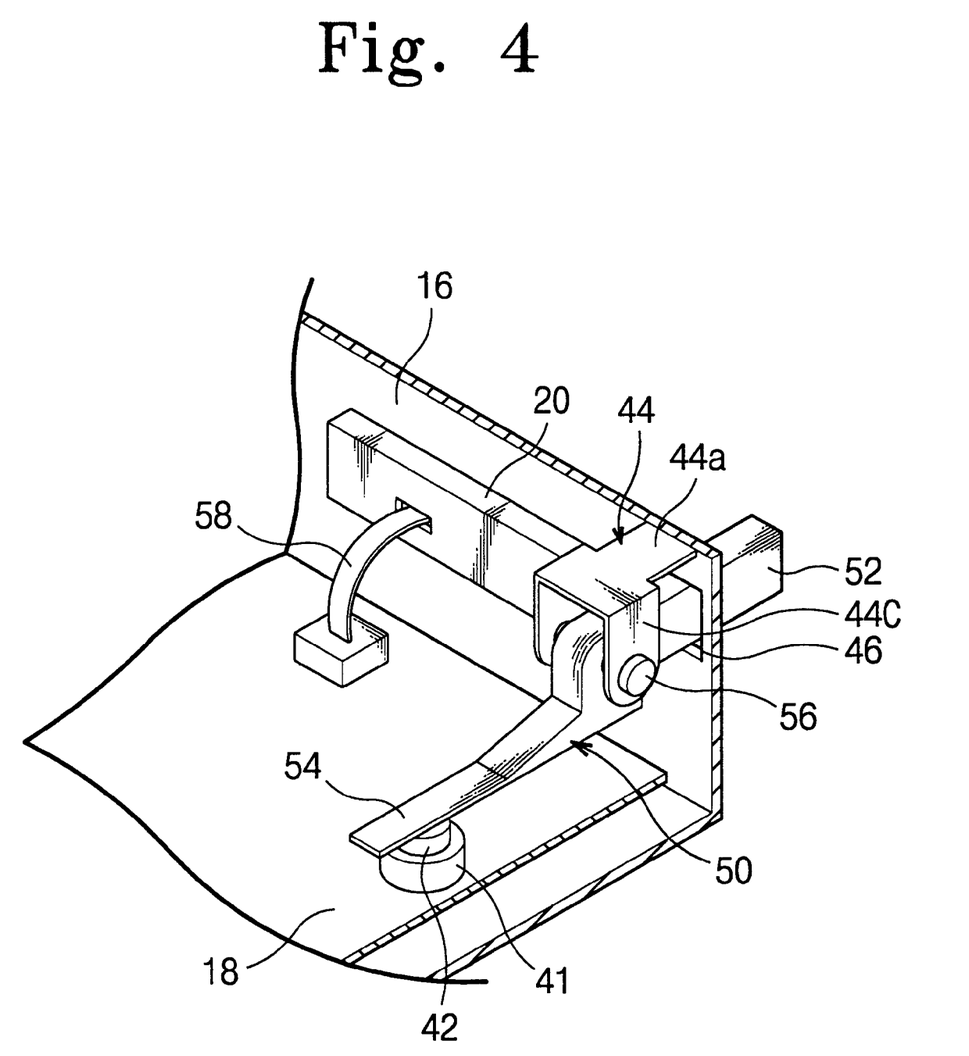
FIG. 4 is an enlarged perspective view depicting assembled state of the automatic power off device of FIG. 3.

The power switch 41 preferably consists of a single-pole single throw (SPST) switch of push button type, and located on the circuit board 18 of the portable computer such that button 42 of the power switch 41 is positioned underneath the elastic blade 54 when the lever 50 is pivotally mounted on the bending portion 44c of the support member 44, as shown in FIG. 4. In this assembled state, it can be seen that the front end of the protrusion 52 passes through the opening 46 of the rear frame 16 at a predetermined length. The opening 46 is formed such that the longitudinal dimension of the opening 46 is much larger than the sectional dimension of the lever 50. Thus, the lever 50 is capable of lifting up by a force applied from underneath the protrusion 52. Upon lifting of the protrusion 52, the elastic blade 54 is moved downwardly to press the button 42 of the power switch 41.

Figure 5:
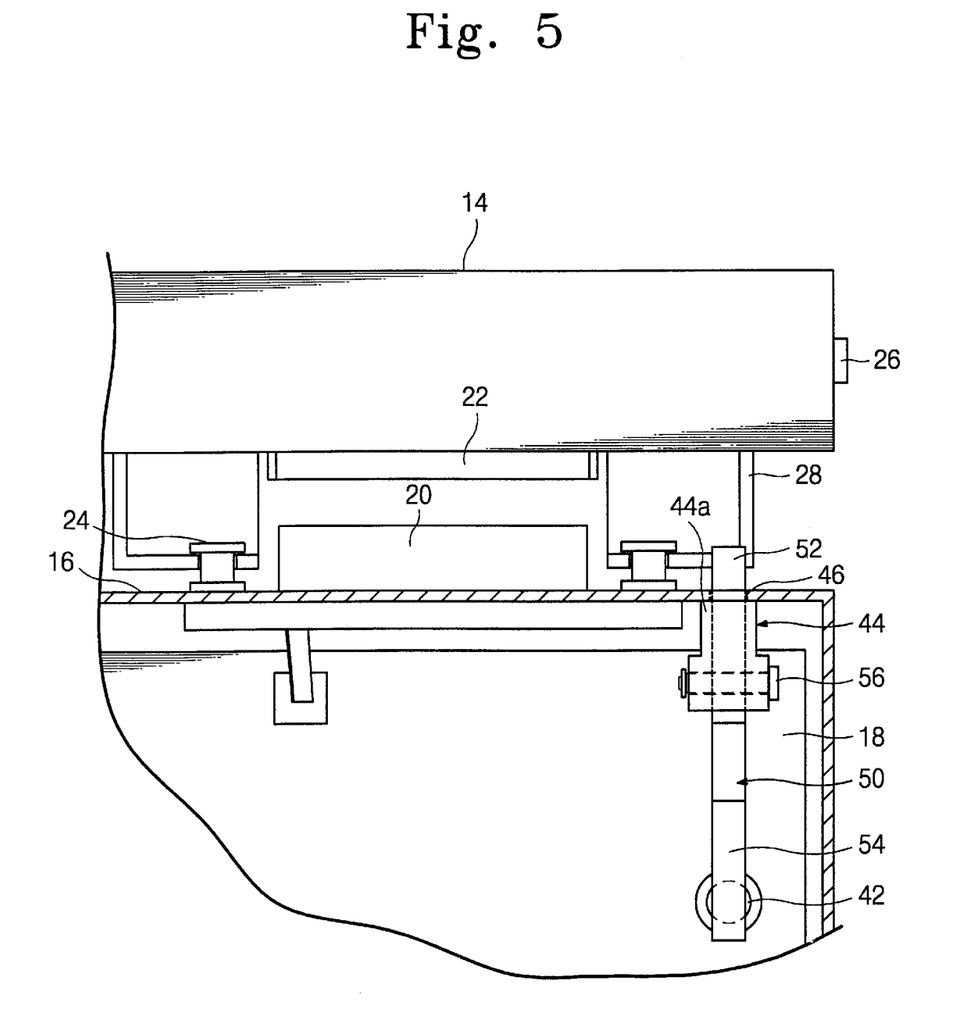
FIG. 5 is a partial plan view for illustrating position of the automatic power off device of the portable computer and a port replicator of the docking station in pre-docking state.

FIG. 5 shows positioning of the protrusion 52 of the lever 50 and the bracket 28 of the docking station 14, when the portable computer 10 is placed on the docking station 14 in a predocking position. It can be seen that the protrusion 52 as well as the mounting screws 24 are located above the front wall of the bracket 28. As previously mentioned, the bracket 28 is drawn towards the back portion of the docking station 14 upon pressing of the button 26. Subsequently, the portable computer 10 is located in position on the docking station as shown in FIG. 5.

Figure 6:
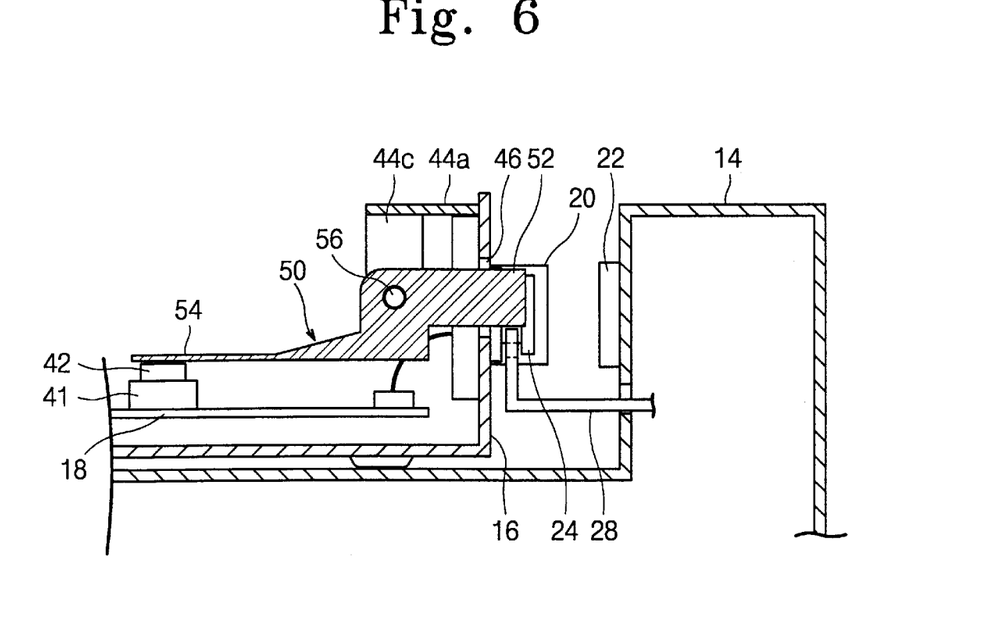
FIGS. 6, 7, and 8 are sectional side elevations taken in line V–V' of FIG. 5 for illustrating operation of the automatic power cutoff device in conjunction with the docking operation of the portable computer and docking station.

Operation of the automatic power off device in conjunction with the docking operation of the portable computer and docking station will be described with reference to FIGS. 6, 7, and 8. FIG. 6 is a schematic sectional side view of FIG. 5, illustrating the pre-docking position of the portable computer 10 and docking station 14. When the bracket 28 is drawn out and main body 12 of the portable computer is placed in position on the docking station 14, the lever 50 is pivotally mounted on the support member 44 with its protrusion 52 above the top portion of the bracket 28 and its elastic blade 54 on the push button 42. It can be seen that the bottom of the protrusion 52 is not in contact with the top portion of the bracket 28 and thus the lever 50 is not operated, whereby the push button 42 is not actuated by the blade 54 and maintains its normal electrically "ON" (closed) state.

Figure 7:
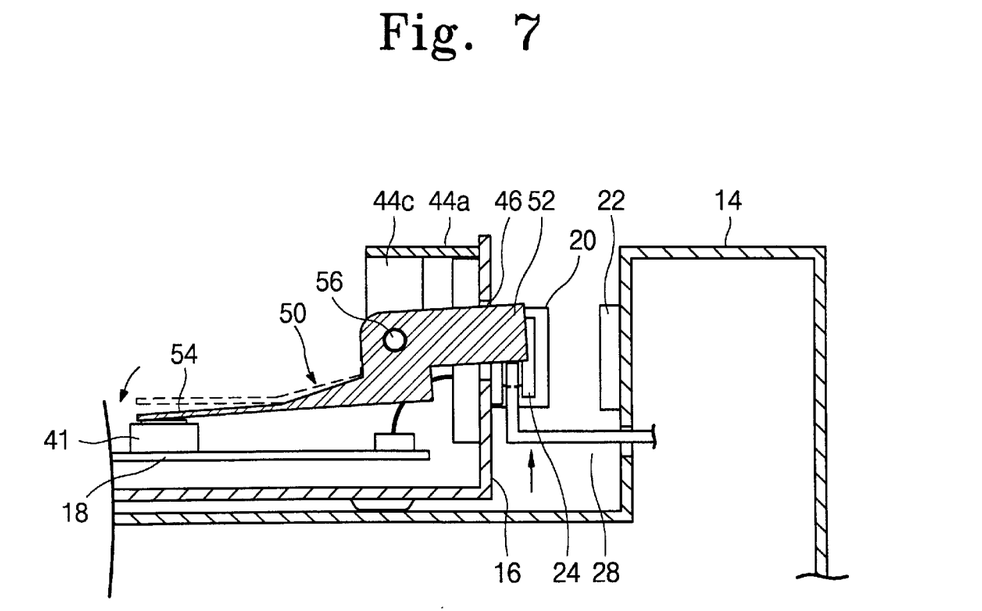

However, when the button 26 of the docking station 14 is pressed to perform docking operation, the bracket 28 drawn out of the docking station 14 is lifted for a predetermined height as shown in FIG. 7. The bracket 28 is lifted to the position where the top portion thereof contacts with groove of the mounting screw 24. At this position, the top portion of the bracket 28 forces the protrusion 52 of the lever 50 to move upwardly and thus rotates the lever 50 counterclockwise. This permits the elastic blade 54 to move downwardly and thus the push button 42 is pressed to operate the switch 41. With this, the switch 41 is changed to its electrical off (open) state.

Figure 8:
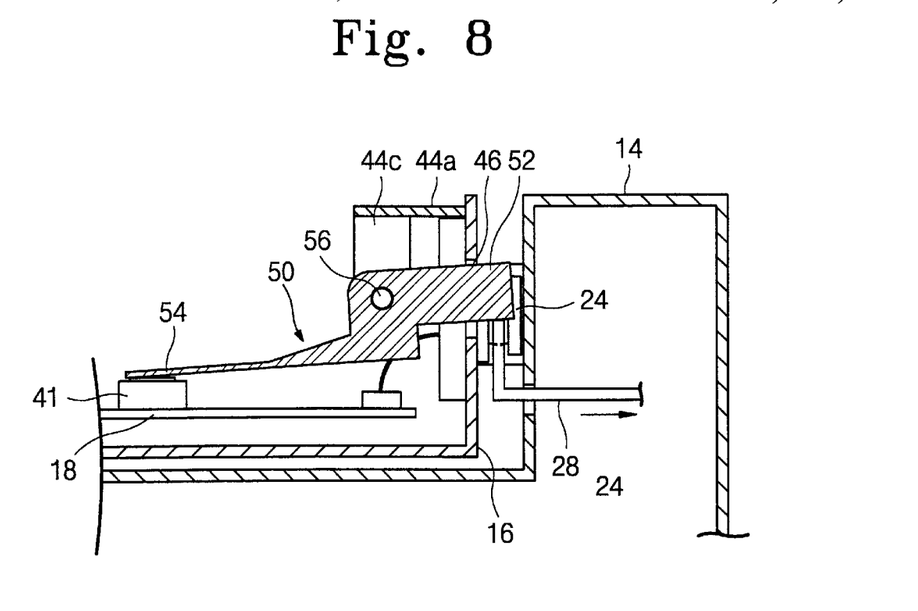

Under the lever actuation state, i.e., the electrical "OFF" state, the bracket 28 is retracted to its full retraction position with catching the mounting screw 24 as shown in FIG. 8. With this, the bracket 28 pulls the mounting screw 24 inwardly to couple the expansion port 20 of the portable computer 10 to the port replicator 22 of the docking station 14. In this docking position, the electrical connection between the portable computer 10 and docking station 14 is completed. Also, power supply from the docking station 14 can be supplied from the portable computer 10 via this connection.

Figure 9:
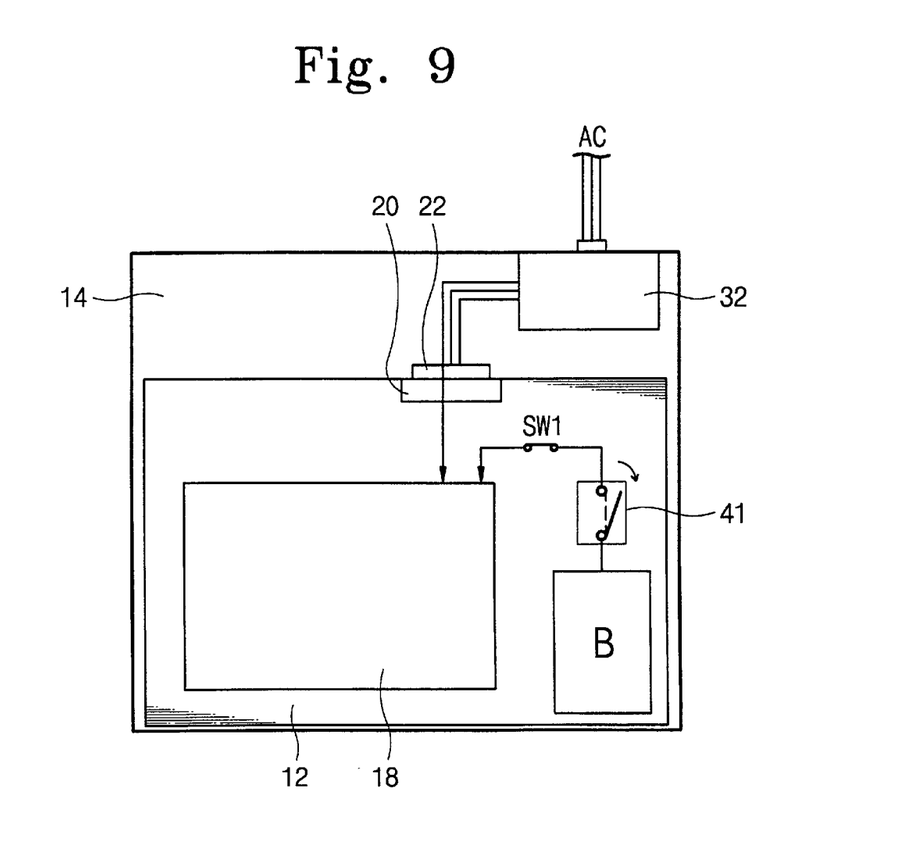
FIG. 9 is a schematic diagram for illustrating electrical power off operation of the portable computer when the automatic power off device is actuated.

FIG. 9 schematically illustrates the power off operation of the push button switch 41 when it is actuated by the lever 50. The docking station includes an AC adaptor 32 supplied with an external AC power, and a battery pack B in a battery receiving bay of the portable computer 10. Even if main power switch SW1 is actuated and the portable computer is supplied with the electrical power from the battery B, the switch 41 interrupts the power supply line between the battery pack B and the mainboard 18 of the portable computer.

As apparent from foregoing, the automatic power off device of the present invention performs power interrupt operation just before coupling of the expansion port 20 of the portable computer 10 to the port replicator 22 of the docking station 14. Thus, the present invention provides for a basic protection of the portable computer against overvoltage applied from the docking station, and thereby preventing unexpected data loss in a semiconductor memory and damage of the computer mainboard.

While the invention has been described in terms of an exemplary embodiment, it is contemplated that it may be practiced as outlined above with modifications within the spirit and scope of the appended claims.

What is claimed is:

1. A computer system having a portable computer and an expansion system for incorporating with the portable computer comprising:

an expansion port arranged at rear frame of the portable computer for communicating with said expansion system;

a connector being arranged at top portion of said expansion system for coupling with said expansion port;

means for interrupting main power supply of the portable computer being arranged to operate in conjunction with docking operation of the expansion system, wherein the main power supply line of the computer is cutoff just before coupling of the expansion port to the connector of the expansion system;

a mounting screw arranged at either side of the expansion port; and a bracket mounted at the expansion system for catching the mounting screw when docking operation is started, wherein the bracket is lifted to the position where the bracket makes contact with the mounting screw, causing and the power supply interrupt means to be actuated.

2. A computer system as claimed in claim 1, wherein the main power supply interrupt means comprising:

a lever pivotally mounted adjacent to one of the mounting screw with one end being passed through the rear frame and the other end being extended in opposite direction at a predetermined length;

an opening formed at port bracket of the rear frame apart from one of said mounting screw for passing through one end of the lever, in which the longitudinal dimension of the opening is much larger than the sectional dimension of the lever; and a switch located on a circuit board of the portable computer such that button of the switch is positioned underneath the other end of the lever and actuated when the lever is lifted up by the bracket of the docking station.

3. The computer system of claim 2, said bracket being actuated by a single push button.

4. A portable computer system, comprising:

a docking station that accommodates a portable computer;

a portable computer, said docking station having a push button that protrudes from said docking station, wherein when said portable computer is placed onto said docking station and said push button is depressed, said portable computer is powered down while said portable computer becomes electrically and mechanically attached to said docking station;

a bracket that is actuated by said push button that protrudes from said docking station;

a lever that is pivotally actuated by said bracket; and a button disposed within said portable computer, wherein when said button disposed within said portable computer is depressed, power is cutoff to said portable computer.

5. The portable computer system of claim 4, wherein said bracket lifts one end of said lever when said push button that protrudes from said docking station is depressed, causing said lever to rotate, causing the other end of said lever to depress said button disposed within said portable computer.

6. The portable computer system of claim 5, said docking station having a back wall having a port replicator disposed thereon, said portable computer having a rear side having an expansion port disposed therein, wherein said bracket pulls said rear side of said portable computer towards said back wall of said docking station when said push button that protrudes from said docking station is depressed, causing said expansion port of said portable computer to electrically and mechanically mate with said port replicator of said docking station.

7. The portable computer system of claim 6, said expansion port of said portable computer mates with said port replicator of said docking station while said button interior to said portable computer is depressed, cutting off power to said portable computer as said expansion port mates with said port replicator.

8. The method of attaching a portable computer to a docking station, comprising:

providing said portable computer with a rear side having an expansion port disposed thereon;

providing said docking station with a back wall having a port replicator disposed thereon;

placing said portable computer onto said docking station having said rear side of said portable computer facing said back wall of said docking station, said portable computer is placed such that said expansion port is near said port replicator; and depressing a button external to said docking station, causing power to said portable computer to be turned off while causing said expansion port to be connected to said port replicator, wherein said depressing of said button external to said docking station causes a bracket disposed within said docking station to lift, causing a lever disposed within said docking station to rotate, causing a button disposed within said portable computer to depress, causing power to be cutoff to said portable computer.

9. The method of claim 8, wherein said depressing of said button external to said docking station causes said bracket disposed within said docking station to retract, causing said bracket to pull said rear side of said portable computer towards said back wall of said docking station, causing said external port to electrically and mechanically connect to said port replicator.

10. The portable computer system of claim 4, wherein said push button is located on a sidewall of said docking station near a rear of said docking station.

11. The portable computer system of claim 4, further comprising:

an expansion port disposed on a rear of said portable computer;

a port replicator disposed on said docking station in operational relationship with said expansion port allowing said expansion port to mate with said port replicator when said portable computer is slid onto said docking station, wherein said bracket is located adjacent to said port replicator on said docking station.

12. The portable computer system of claim 11, further comprising mounting screws disposed on a rear frame of said portable computer, said mounting screws being in operational relationship to said bracket.

13. A portable computer system, comprising:

a docking station that accommodates a portable computer, said docking station having a first button that protrudes from said docking station;

a portable computer;

a bracket that is actuated by said first button;

a lever that is pivotally actuated by said bracket; and a second button disposed within said portable computer, wherein when said first button is depressed, said second button is automatically depressed, cutting off power to said portable computer.

14. The portable computer system of claim 13, wherein said bracket lifts one end of said lever when said first button is depressed, causing said lever to rotate, causing the other end of said lever to depress said second button.

15. The portable computer system of claim 14, said docking station having a back wall having a port replicator disposed thereon, said portable computer having a rear side having an expansion port disposed therein, wherein said bracket pulls said rear side of said portable computer towards said back wall of said docking station when said first button is depressed, causing said expansion port of said portable computer to electrically and mechanically mate with said port replicator of said docking station.

16. The portable computer system of claim 15, said expansion port of said portable computer mates with said port replicator of said docking station while said second button is depressed, cutting off power to said portable computer as said expansion port mates with said port replicator.

17. The portable computer system of claim 13, wherein said first button is located on a sidewall of said docking station near a rear of said docking station and is user operated.

18. The portable computer system of claim 13, further comprising:

an expansion port disposed on a rear of said portable computer;

a port replicator disposed on said docking station in operational relationship with said expansion port allowing said expansion port to mate with said port replicator when said portable computer is slid onto said docking station, wherein said bracket is located adjacent to said port replicator on said docking station.

19. The portable computer system of claim 13, further comprising mounting screws disposed on a rear frame of said portable computer, said mounting screws being in operational relationship to said bracket.

* * * * *